(12) United States Patent
Huq et al.

(10) Patent No.: US 6,447,947 B1
(45) Date of Patent: Sep. 10, 2002

(54) ZINC/AIR CELL

(75) Inventors: Rokeya Huq, Norwood, MA (US);
Peter R. Moses, Windham, NH (US);
David Pappas, Waltham; Guang Wei,
Southborough, both of MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/459,511

(22) Filed: Dec. 13, 1999

(51) Int. Cl.[7] .......................... H01M 6/00; H01M 2/02; H01M 2/04

(52) U.S. Cl. .................. 429/176; 29/623.1; 429/166

(58) Field of Search .................... 429/163, 176, 429/164, 166–169; 29/623.1

(56) References Cited

U.S. PATENT DOCUMENTS

| | | |
|---|---|---|
| 3,897,265 A | 7/1975 | Jaggard |
| 4,238,555 A * | 12/1980 | Uetani et al. ............... 429/163 |
| 5,279,905 A | 1/1994 | Mansfield ................... 429/27 |
| 5,604,055 A * | 2/1997 | Brown et al. ............... 429/176 |
| 5,656,395 A * | 8/1997 | Dopp et al. ................. 429/233 |
| 5,792,553 A * | 8/1998 | Moriyama et al. .......... 428/323 |

FOREIGN PATENT DOCUMENTS

| | | |
|---|---|---|
| JP | 61-22564 A | 1/1986 |
| JP | 06-346284 | 12/1994 |
| JP | 07-94153 A | 4/1995 |

* cited by examiner

*Primary Examiner*—Carol Chaney
*Assistant Examiner*—Tracy Dove
(74) *Attorney, Agent, or Firm*—Barry D. Josephs; Paul I. Douglas; Thomas G Krivulka

(57) ABSTRACT

A process for heat treating an anode casing of a zinc/air depolarized cell after the casing has been formed but before anode material comprising zinc is inserted therein. The anode casing has a layer of copper on its inside surface. The process comprises heat treating the anode casing by passing a gas at a temperature between about 200° C. and 700° C., preferably between about 300° C. and 600° C. in contact therewith to form a heat treated anode casing and then cooling said heat treated anode casing to ambient temperature. The heat treated anode casing is stored away from atmospheric air until anode active material is inserted therein during cell assembly. The heat treating process significantly reduces gassing during cell discharge and storage and eliminates the need to add mercury to the anode material.

19 Claims, 2 Drawing Sheets

ZINC/AIR CELL

FIELD OF THE INVENTION

The invention relates to a metal/air cell having an anode comprising zinc and an air cathode. The invention relates to a process of heat treating a copper surface forming the inside surface of the cell's anode casing, such as by passing a heated gas in contact therewith.

BACKGROUND

Zinc/air cells are typically in the form of a miniature button cells which have particular utility as batteries for electronic hearing aids including programmable type hearing aids. Such miniature cells typically have a disk-like cylindrical shape of diameter between about 4 and 12 mm and a height between about 2 and 6 mm. Zinc air cells can also be produced in somewhat larger sizes having a cylindrical casing of size comparable to conventional AAAA, AAA, AA, C and D size $Zn/MnO_2$ alkaline cells and even larger sizes.

The miniature zinc/air button cell typically comprises an anode casing (anode cup), and a cathode casing (cathode cup). The anode casing and cathode casing each can have a closed end an open end. After the necessary materials are inserted into the anode and cathode casings, the open end of the anode casing is typically inserted into the open end of the cathode casing and the cell sealed by crimping. The anode casing can be filled with a mixture comprising particulate zinc. Typically, the zinc mixture contains mercury and a gelling agent and becomes gelled when electrolyte is added to the mixture. The electrolyte is usually an aqueous solution of potassium hydroxide, however, other aqueous alkaline electrolytes can be used. The cathode casing contains an air diffuser (air filter) which lines the inside surface of the cathode casing's closed end. The air diffuser can be selected from a variety of air permeable materials including paper and porous polymeric material. The air diffuser is placed adjacent air holes in the surface of the closed end of the cathode casing. Catalytic material typically comprising a mixture of particulate manganese dioxide, carbon and hydrophobic binder can be inserted into the cathode casing over the air diffuser on the side of the air diffuser not contacting the air holes. An ion permeable separator is typically applied over the catalytic material so that it faces the open end of the cathode casing.

The cathode casing can typically be of nickel plated stainless steel, for example, with the nickel plate forming the cathode casing's outside surface and stainless steel forming the casing's inside surface. The anode casing can also be of nickel plated stainless steel, typically with the nickel plate forming the casing's outside surface. The anode casing can be of a triclad material composed of stainless steel having an outer layer of nickel and an inner layer of copper. In such embodiment the nickel layer typically forms the anode casing's outside surface and the copper layer forms the anode casing's inside surface. The copper inside layer is desirable in that it provides a highly conductive pathway between the zinc particles and the cell's negative terminal at the closed end of the anode casing. An insulator ring of a durable, polymeric material can be inserted over the outside surface of the anode casing. The insulator ring is typically of high density polyethylene, polypropylene or nylon which resists flow (cold flow) when squeezed.

After the anode casing is filled with the zinc mixture and after the air diffuser, catalyst, and ion permeable separator is placed into the cathode casing, the open end of the anode casing can be inserted into the open end of the cathode casing. The peripheral edge of the cathode casing can then be crimped over the peripheral edge of the anode casing to form a tightly sealed cell. The insulator ring around the anode casing prevents electrical contact between the anode and cathode cups. A removable tab is placed over the air holes on the surface of the cathode casing. Before use, the tab is removed to expose the air holes allowing air to ingress and activate the cell. A portion of the closed end of the anode casing can function as the cell's negative terminal and a portion of the closed end of the cathode casing can function as the cell's positive terminal.

Typically, mercury is added in amount of at least one percent by weight, for example, about 3 percent by weight of the zinc in the anode mix. The mercury is added to the anode mix to reduce the hydrogen gassing which can occur as a side reaction in the zinc/air cell during discharge and when the cell is placed in storage before or after discharge. The gassing, if excessive, can reduce the cell capacity and increase the chance of electrolyte leakage. Such leakage can damage or destroy the hearing aid or other electronic component being powered. Many regions around the world now greatly restrict the use of mercury in electrochemical cells because of environmental concerns. If other potential gassing inhibitors are added to the anode mix instead of mercury, they either significantly reduce the anode conductivity or have to be added in quantity, thereby significantly reducing the cell's capacity (mAmp-hrs).

U.S. Pat. No. 3,897,265 discloses a representative zinc/air button cell construction with an anode casing inserted into the cathode casing. There is disclosed an insulator between the anode and cathode casings. The anode comprises zinc amalgamated with mercury. The cell includes an assembly comprising an air diffuser, cathode catalyst, and separator at the closed end of the cathode casing facing air holes in the surface of the cathode casing.

U.S. Pat. No. 5,279,905 discloses a miniature zinc/air cell wherein little or no mercury has been added to the anode mix. Instead, the inner layer of the anode casing has been coated with a layer of indium. The disclosed anode casing can be a triclad material composed of stainless steel plated on the outside surface with nickel and on the inside surface with copper. The copper layer is at least 1 microinch ($25.4 \times 10^{-6}$ mm). The reference discloses coating the copper layer on the anode casing's inside surface with a layer of indium. The indium layer is disclosed as being between about 1 microinch and 5 microinches ($25.4 \times 10^{-6}$ mm and $127 \times 10^{-6}$ mm).

It is thus desired to produce a zinc/air cell without added mercury.

It is desired to eliminate the need to add mercury to the zinc/air cell without increasing gassing within the cell, yet while obtaining good cell performance.

SUMMARY OF THE INVENTION

An aspect of the invention is directed to heat treating the anode casing of a metal/air depolarized cell, desirably the anode casing of a zinc/air cell. The invention can be specifically directed to heat treating the anode casing of a miniature zinc/air button cell useful as a power source for hearing aids. The process of the invention is directed to heat treating the anode casing, preferably after it is stamped into shape but before anode active material is inserted therein. Such heat treatment of the anode casing after the anode casing is formed but before active material is inserted therein can be referenced herein as post heat treatment of the anode casing. This is not to say that the metal sheeting from which the anode casing is formed may be heat treated before stamping. The anode casing has a copper layer lining its inside surface. The anode casing is preferably of a triclad material comprising stainless steel having an outside layer of nickel and an inside layer of copper.

A principal aspect of the invention involves (a) heat treating said anode casing such as with a gas passed in contact therewith at a temperature between about 200° C. and 700° C., preferably a temperature between about 300° C. and 600° C., to form a heat treated anode casing, and (b) cooling the heat treated anode casing to ambient temperature. The heat treated anode casing is then preferably stored away from atmospheric air, for example, in a vacuum sealed bag, until it is ready to be filled with anode active material during cell assembly. Preferably, the anode casing is heat treated in a quartz furnace by passing a treating gas therethrough in contact with the casing. The anode casing can be placed in a quartz tube within the furnace and the treating gas passed through the furnace so that it contacts the anode casing. The treating gas is preferably a reducing gas, for example, a gas comprising hydrogen. A preferred reducing gas comprises about 5 wt. % hydrogen and 95 wt. % inert or substantially inert gas such as argon or nitrogen.

The heat treating of the anode casing can desirably be carried out in essentially two steps: a.1) an initial heating period (ramp period) wherein the furnace temperature and consequently the temperature of the treating gas passing therethrough in contact with the anode casing is gradually increased from an initial temperature to a desired elevated (soak) temperature, and a.2) a primary heating period wherein the treating gas temperature in contact with the anode casing is maintained at said elevated (soak) temperature for a set period time (soak period). The initial temperature of the gas in contact with the anode casing can be at about room temperature (20° C.) or lower, but also can be higher, for example, a temperature between about 20° C. and 30° C. The soak temperature is desirably a temperature between about 300° C. and 700° C., preferably a temperature between about 300° C. and 600° C., more preferably a temperature between about 400° C. and 600° C. The soak temperature is preferably maintained at a constant temperature within the above stated soak temperature range, but can also be a variable temperature within the above stated soak temperature ranges. The treating gas flow in contact with the anode casing is maintained throughout the primary heating and soak period. Once the soak temperature is reached, the anode casing is desirably exposed to the flowing treatment gas at soak temperature for a relatively short period of between about 5 and 25 minutes, preferably for about 15 minutes. The treating gas can be passed through the furnace and in contact with anode casing with the gas in either laminar or turbulent flow. Thus, the rate of gas flow is not critical and a slow rate of gas flow of between about 8 and 10 cubic centimeters per minute has been determined to be satisfactory. After the soak period, the furnace is shut off and while the heat treated anode casing is still in the furnace, the casing is subjected to a cooling step wherein it is allowed to cool gradually to ambient temperature, for example, to room temperature between about 20° C. and 30° C. Upon cooling to room temperature the heat treated anode casing is preferably stored away from atmospheric air, for example, in a vacuum sealed bag until it is desired to fill it with anode active material during cell construction.

It has been determined that the heat treating process of the invention as applied to said anode casing reduces gassing in a zinc/air cell utilizing the heat treated casing. The resulting reduction in gassing is significant enough that the need to add mercury to the anode mixture is entirely eliminated.

It is not known with certainty why the heat treatment process of the invention causes a significant reduction in cell gassing. It is theorized that the anode casing inside layer of copper develops surface deposits of copper oxide (CuO) as well as deposits of other oxides and contaminants during the storage period which can be a period of weeks or months from the time that the casing is formed, e.g. by stamping, until it is actually used in cell assembly. Such oxides can act as a catalyst which increases the rate of the primary gassing reaction between zinc and water to produce zinc oxide and hydrogen gas. The heat treatment process of the invention is believed to reduce the amount of copper oxides and other oxides and contaminants from the surface of the copper layer thereby reducing the rate of hydrogen gas production. The heat treatment process of the invention also produces a smoother copper surface on the inside of the anode casing, which in turn reduces the number of active sites for the gassing reaction to occur.

BRIEF DESCRIPTION OF THE DRAWINGS

The invention will be better understood with reference to the drawings in which.

DETAILED DESCRIPTION

Figure 1:
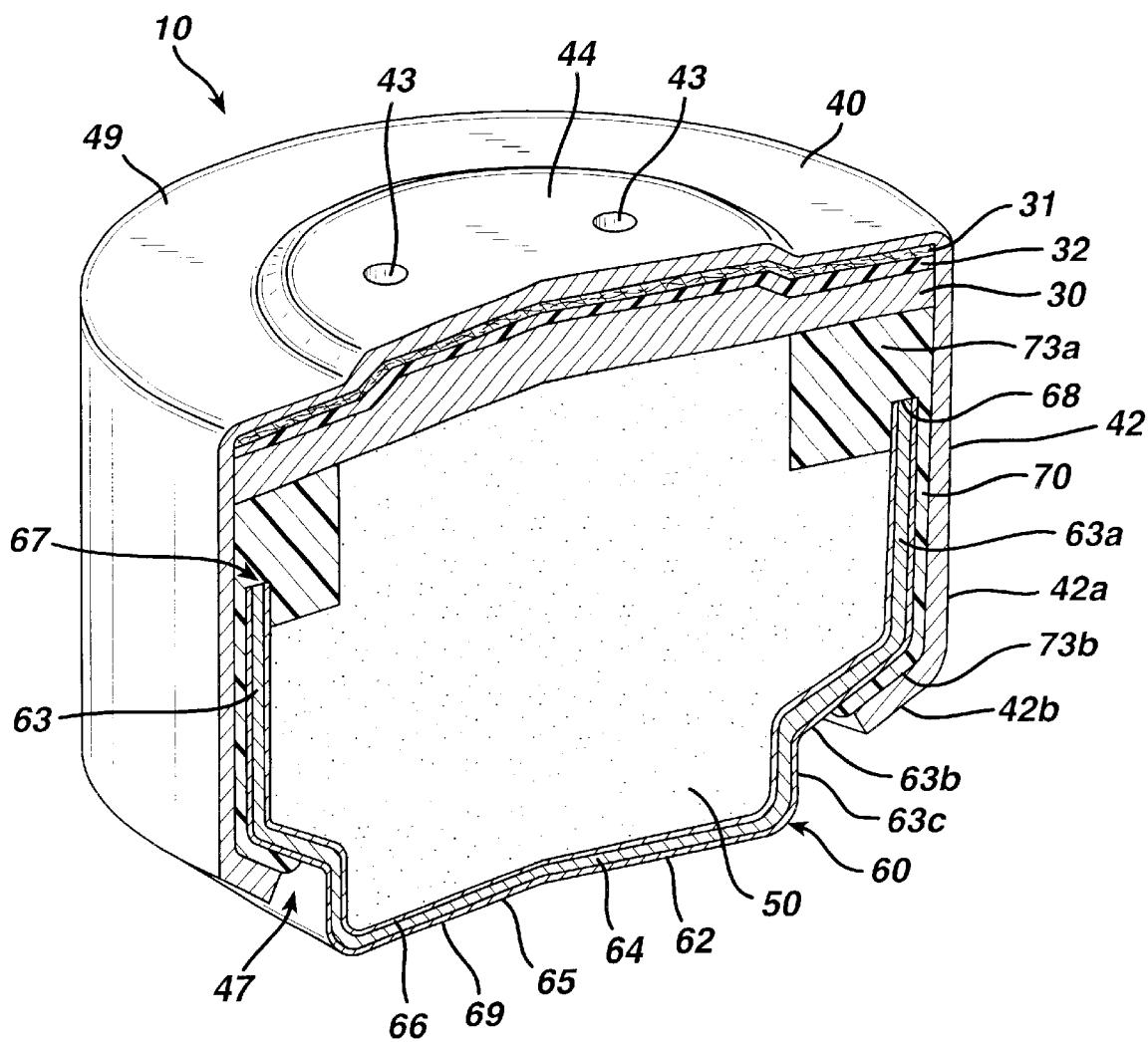
FIG. 1 is an isometric cross sectional view of an embodiment of the zinc/air cell of the invention.

The invention is directed to gas depolarized electrochemical cells. Such cells have a metal anode, typically comprising zinc and an air cathode. The cell is commonly referred to as a metal/air depolarized cell, and more typically a zinc/air cell.

The zinc/air cell of the invention is essentially mercury free and desirably in the form of a miniature button cell. It has particular application as a power source for electronic hearing aids. The miniature zinc/air cell of the invention typically has a disk-like cylindrical shape of diameter between about 4 and 16 mm, preferably between about 4 and 12 mm and a height between about 2 and 9 mm, preferably between about 2 and 6 mm. The miniature zinc/air cell typically has an operating load voltage between between about 1.1 volt to 0.2 volt. The cell typically has a substantially flat discharge voltage profile between about 1.1 and about 0.9 volt whereupon the voltage can then fall fairly abruptly to zero. The cell can be discharged at a rate between about 5 and 15 milliAmp. The term "miniature cells" or "miniature button cells" as used herein is intended to include such small size button cells, but is not intended to be restricted thereto, since other shapes and sizes for small zinc/air cells are possible. For example, zinc air cells could also be produced in somewhat larger sizes having a cylindrical casing of size comparable to conventional AAAA, AAA, AA, C and D size $Zn/MnO_2$ alkaline cells, and even larger. The present invention is also intended to be applicable to such larger cell sizes and also to other cell shapes, for example, prismatic or elliptical shapes.

The cell of the invention does not contain any added mercury (zero added mercury cell) and thus is essentially mercury free. In such zero added mercury cells there is no added mercury and the only mercury present is in trace amounts naturally occurring with the zinc. Accordingly, the cell of the invention has a total mercury content less than about 50 parts per million parts of total cell weight, preferably less than 20 parts per million of total cell weight, more preferably less than about 10 parts per million of total cell weight. (The term "essentially mercury free" as used herein shall mean the cell has a mercury content less than about 50 parts per million parts of total cell weight.) The cell of the invention can have a very small amount of lead additive in the anode. If lead is added to the anode, the lead content in the cell can typically be between about 100 and 600 ppm of total metal content in the anode. However, the cell of the invention desirably does not contain added amounts of lead and thus is also essentially lead free, that is, the total lead content is less than 30 ppm, desirably less than 15 ppm of the total metal content of the anode.

The zinc/air cell 10 of the invention has an anode casing 60, a cathode casing 40, and electrical insulator material 70 therebetween. The anode casing 60 has body 63, an integral closed end 69, and an open end 67. The cathode casing 40 has a body 42, an integral closed end 49 and an open end 47. The anode casing 60 contains an anode mixture 50 comprising zinc and alkaline electrolyte. The cathode casing 40 has a plurality of air holes 43 in its surface at the closed end thereof and a catalytic composite material 34 placed within the casing proximate to the air holes. During cell discharge, the catalytic material 34 facilitates the electrochemical reaction with ambient oxygen as it ingresses through air holes 43.

It has been determined that if the anode casing 60 of the zinc/air cell 10 of the invention is plated with a layer of copper 66 on its inside surface and the copper is heat treated such as with a hot gas after the casing has been formed but before anode material 50 is inserted therein, a significant reduction in gassing can be realized during cell discharge and storage. The heat treatment process of the invention is believed to eliminate the copper oxides and other oxides and contaminants from the surface of the copper layer thereby reducing the rate of hydrogen gas production during cell discharge and storage. The reduction in cell gassing realized from heat treating the copper layer 66, is significant enough to eliminate the need to add mercury to the anode active mixture 50. In particular it has been determined that the mercury conventionally added in an amount of about 3 percent by weight of the anode mixture can be eliminated without substituting other gassing inhibitors into the zinc and anode mixture. Also, the total amount of zinc in the anode mix 50 can be increased in amount replacing the mercury, resulting in an increase in the cell's capacity (mAmp-hrs).

A preferred embodiment of a zinc/air cell of the invention is shown in FIG. 1. The embodiment shown in FIG. 1 is in the form of a miniature button cell. The cell 10 comprises a cathode casing 40 (cathode cup) an anode casing 60 (anode cup) with an electrical insulator material 70 therebetween. The insulator 70 can desirably be in the form of a ring which can be inserted over the outside surface of the anode casing body 63 as shown in FIG. 1. Insulator ring 70 desirably has an enlarged portion 73a extending beyond peripheral edge 68 of the anode casing (FIG. 1). The insulator 70 with enlarged portion 73a prevents anode active material from contacting the cathode casing 40 after the cell is sealed. Insulator 70 is of a durable electrically insulating material such as high density polyethylene, polypropylene or nylon which resists flow (resists cold flow) when squeezed.

The anode casing 60 and cathode casing 40 are initially separate pieces. The anode casing 60 and cathode casing 40 are separately filled with active materials, whereupon the open end 67 of the anode casing 60 can be inserted into the open end 47 of cathode casing 40. The anode casing 60 is characterized by having a first straight body potion 63a of maximum diameter which extends vertically downwardly (FIG. 1) from peripheral edge 68 to a point which is more than at least 50% of the anode casing 60 height whereupon the casing is slanted inwardly to form slanted midportion 63b. There is a second straight portion 63c extending vertically downwardly from the terminal end of midportion 63b. The second straight portion 63c is of smaller diameter than straight portion 63a. The portion 63c terminates with a 90° bend forming the closed end 69 having a relatively flat negative terminal surface 65. The body 42 of cathode casing 40 has straight portion 42a of maximum diameter extending vertically downwardly from closed end 49. The body 42 terminiates in peripheral edge 42b. The peripheral edge 42b of cathode casing 40 and underlying peripheral edge 73b of insulator ring 70 are initially vertically straight and can be mechanically crimped over the slanted midportion 63b of the anode casing 60. This locks the cathode casing 40 in place over the anode casing 60 and forms a tightly sealed cell.

Anode casing 60 can be separately filled with anode active material by first preparing a mixture of particulate zinc and powdered gellant material. The zinc average particle size is desirably between about 30 and 350 micron. The zinc can be pure zinc or can be in the form of particulate zinc alloyed with indium (100 to 1000 ppm). The zinc can also be in the form a particulate zinc alloyed with indium (100 to 1000 ppm) and lead (100 to 1000 ppm). Other alloys of zinc, for example, particulate zinc alloyed with indium (100 to 1000 ppm) and bismuth (100 to 1000 ppm) can also be used. These particulate zinc alloys are essentially comprised of pure zinc and have the electrochemical capacity essentially of pure zinc. Thus, the term "zinc" shall be understood to include such materials. The gellant material can be selected from a variety of known gellants which are substantially insoluble in alkaline electrolyte. Such gellants can, for example, be cross linked carboxymethyl cellulose (CMC); starch graft copolymers, for example in the form of hydrolyzed polyacrylonitrile grafted unto a starch backbone available under the designation Waterlock A221 (Grain Processing Corp.); cross linked polyacrylic acid polymer available under the trade designation Carbopol C940 (B.F. Goodrich); alkali saponified polyacrylonitrile available under the designation Waterlock A 400 (Grain Processing Corp.); and sodium salts of polyacrylic acids termed sodium polyacrylate superabsorbent polymer available under the designation Waterlock J-500 or J-550. A dry mixture of the particulate zinc and gellant powder can be formed with the gellant forming typically between about 0.1 and 1 percent by weight of the dry mixture. A solution of aqueous KOH electrolyte solution comprising between about 30 and 40 wt % KOH and about 2 wt % ZnO is added to the dry mixture and the formed wet anode mixture 50 can be inserted into the anode casing 60. Alternatively, the dry powder mix of particulate zinc and gellant can be first placed into the anode casing 60 and the electrolyte solution added to form the wet anode mixture 50.

Figure 2:
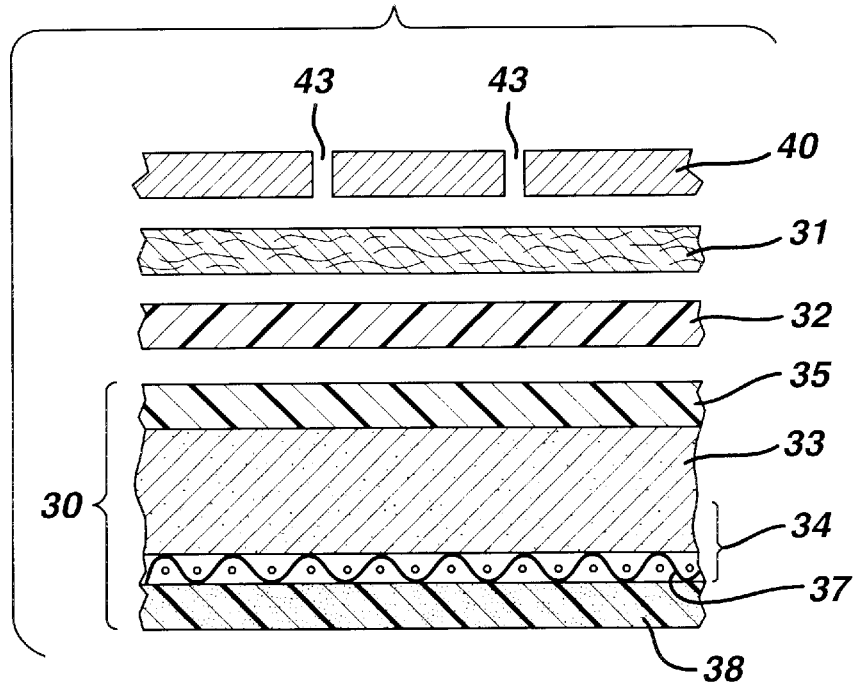
FIG. 2 is an exploded view of the catalytic cathode assembly and air diffuser referenced in FIG. 1.

A catalytic cathode assembly 30 and air diffuser 31 can be inserted into casing 40 as follows: An air diffuser disk 31 (FIGS. 1 and 2), which can be in the form of an air porous filter paper or porous polymeric material can be inserted into the cathode casing 40 so that lies against air holes 42. A separate electrolyte barrier layer 32 (FIGS. 1 and 2), for example, of polytetrafluroethylene (Teflon) can optionally be inserted over the air diffuser 31. The barrier layer 32, if employed, should be hydrophobic and desirably functions to prevent electrolyte from leaking from the cell without significantly retarding the inflow of air into the cell. A catalytic cathode assembly 30 as shown in FIG. 2 can be prepared as a laminate comprising a layer of electrolyte barrier material 35, a layer of cathode catalyst composite 34 under the barrier layer 35 and a layer of ion permeable separator material 38 under the catalyst composite 34, as shown in FIG. 2. Each of these layers can be separately prepared and laminated together by application of heat and pressure to form the catalytic assembly 30. The electrolyte barrier layer 35 can desirably be of polytetrafluroethylene (Teflon). The separator 38 can be selected from conventional ion permeable separator materials including cellophane, polyvinylchloride, acrylonitrile, and microporous polypropylene.

Catalytic cathode composite 34 desirably comprises a hydrophobic catalytic cathode mixture 33 of particulate manganese dioxide, carbon, and hydrophobic binder which is applied by conventional coating methods to a surface of an electrically conductive screen 37, preferably a nickel mesh screen. Other catalytic materials may be included or employed such as metals like silver, platinum, palladium, and ruthenium or other oxides of metals or manganese ($MnO_x$) and other components known to catalyze the oxygen reduction reaction. During application the catalytic mixture 33 is substantially absorbed into the porous mesh of screen 37. The manganese dioxide used in the catalytic mixture 33 can be conventional battery grade manganese dioxide, for example, electrolytic manganese dioxide (EMD). The manganese dioxide in catalytic mixture 33 can also be manganese dioxide formed from the thermal decomposition of manganese nitrate $Mn(No_3)_2$. The carbon used in preparation of mixture 33 can be in various forms including graphite, carbon black and acetylene black. A preferred carbon is carbon black because of its high surface area. A suitable hydrophobic binder can be polytetrafluroethylene (Teflon). The catalytic mixture 33 may typically comprise between about 3 and 10 percent by weight $MnO_2$, 10 and 20 percent by weight carbon, and remainder binder. During cell discharge the catalytic mixture 33 acts primarily as a catalyst to facilitate the electrochemical reaction involving the incoming air. However, additional manganese dioxide can be added to the catalyst and the cell can be converted to an air assisted zinc/air or air assisted alkaline cell. In such cell at least a portion of manganese dioxide becomes discharged, that is, some manganese is reduced during electrochemical discharge along with incoming oxygen.

The individual layers, namely barrier layer 35, catalyst composite 34, and separator 38 can be laminated by application of heat and pressure to form the catalytic assembly 30 shown in FIG. 2. Assembly 30 can be inserted into the cathode casing 40 so that it abuts air diffuser 31 with separator layer 38 facing the open end of casing 40, as shown in FIG. 1. After the air diffuser 31 and catalytic assembly 30 are inserted into casing 40, the open end 67 of the filled anode casing 60 can be inserted into the open end 47 of cathode casing 40. The peripheral edge 42b of the cathode casing can be crimped over the slanted midportion 63b of the anode casing with insulator 70 therebetween, as above described.

Figure 3:
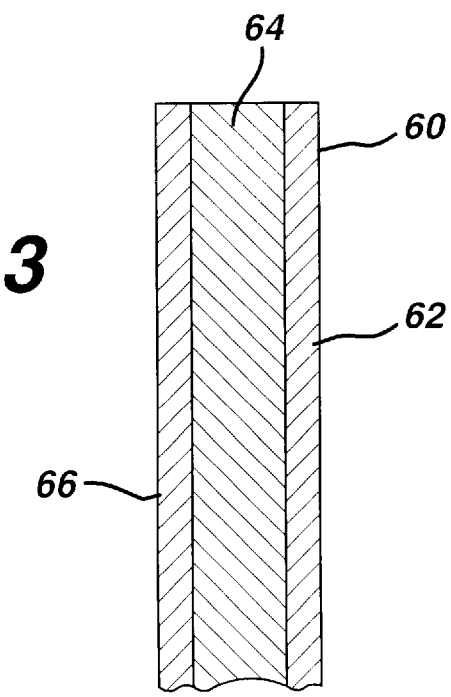
FIG. 3 is a cross sectional view of an embodiment of the cathode casing wall.

In the preferred embodiment (FIG. 1) the anode casing 60 has a layer of copper 66 plated or clad on its inside surface so that in the assembled cell the zinc anode mix 50 contacts the copper layer. The copper plate is desired because it provides a highly conductive pathway for electrons passing from the anode 50 to the negative terminal 65 as the zinc is discharged. The anode casing 60 is desirably formed of stainless steel which is plated on the inside surface with a layer of copper. Preferably, anode casing 60 is formed of a triclad material composed of stainless steel 64 with a copper layer 66 on its inside surface and a nickel layer 62 on its outside surface as shown in FIG. 3. Thus, in the assembled cell 10 the copper layer 66 forms the anode casing inside surface in contact with the zinc anode mix 50 and the nickel layer 62 forms the anode casing's outside surface.

The copper layer 66 desirably has a thickness between about 0.0002 inches (0.005 mm) and 0.002 inches (0.05 mm). The stainless steel typically has a thickness between about 0.001 inches (0.0254 mm) and 0.01 inches (0.254 mm) and the nickel layer between about 0.0001 inches (0.00254 mm) and 0.001 inches (0.0254 mm). The total wall thickness of the anode casing 60 composed of the triclad material can be desirably between about 0.001 inches (0.0254 mm) and 0.015 inches (0.38 mm).

In the process of the invention anode casing 60 can be first stamped into a shape the same or similar to that shown in FIG. 1. The anode casing can be formed of the above triclad material having a copper layer 66 forming the casing's inside surface. In accordance with the invention after the casing 60 has been stamped into the desired shape, the copper surface is heat treated (post heat treatment), preferably by subjecting the anode casing 60 to a flowing treating gas preferably a reducing gas which has been heated to temperature between about 200° C. and 700° C., preferably between about 300° C. and 600° C. Other well known heat treatment and gas contacting methods may be used. A preferred reducing gas is a mixture of hydrogen and nitrogen, desirably 5 percent by weight hydrogen and about 95 percent by weight nitrogen. The heat treatment can be conveniently accomplished by placing the anode casing 60 in a ceramic casing or boat which is open at its top. The ceramic casing with casing 60 therein can be placed into a quartz receiving tube within an electrically heated quartz furnace. The treating gas may be at or below ambient temperature as it enters the furnace, but is heated almost instantly to furnace temperature as it passes slowly through the furnace and contacts the anode casing. Thus, the initial temperature at which the gas contacts the anode casing can be room temperature (20° C.). However, the initial temperature at which the gas contacts the anode casing can be at higher temperature, for example, between about room temperature 20° C. and 30° C. While the casing 60 is in the furnace and the treating gas is being passed therethrough an in contact with the anode casing, the heat treatment can be accomplished in essentially two steps a) an initial heating period (ramp period) wherein the furnace temperature and consequently the temperature of the reducing gas passing therethrough gradually increases from said initial temperature to a desired elevated temperature and b) a primary (soak) heating period wherein the gas temperature is maintained at the elevated temperature for set period time (soak period).

During the initial (ramp) heating period the furnace temperature and therefore also the temperature of the treating gas passing therethrough is gradually raised at a rate of between about 5 and 15 degrees centigrade per minute. The treating gas flow rate is preferably maintained at a slow rate desirably between about 8 and 10 cubic centimeters per minute during the initial (ramp) heating period. However, the treating gas flow can be at higher rates, for example, turbulent flow rates. The initial (ramp) heating can typically be for a period between about 15 and 60 minutes and even longer depending on the rate of furnace temperature increase selected. The initial (ramp) heating is carried out until the desired elevated soak temperature is reached. The desired soak temperature can be a temperature between about 200° C. and 700° C., preferably between about 300° C. and 600° C., more preferably between about 400° C. and 600° C. The soak temperature is preferably maintained at a constant temperature for operational ease and consistency of product. However, it will be appreciated that the soak temperature can be varied during the primary (soak) heating period as long as it is maintained within a range from 200° C. to 700° C., preferably between about 300° C. and 600° C. Once the soak temperature is reached, the anode casing 60 is exposed to the flowing reducing gas at soak temperature for a relatively short period of between about 5 and 25 minutes (primary heating period), preferably for about 15 minutes. The flow rate of the treating gas during the soak period can be varied during the period and increased to higher rates. However, it is satisfactory to maintain the treating gas at about the same flow rate during both the initial the primary heating periods, namely, at a slow rate of between about 8 and 10 cubic centimeters per minute.

After the primary (soak) heating period, the furnace is shut off and while the heat treated casing 60 is still in the furnace, the casing is allowed to cool gradually to room temperature, e.g. to a temperature between about 20° C. and 30° C., preferably while still under flow contact with reducing gas. Upon cooling to room temperature the heat treated anode casing is stored in a vacuum sealed bag until it is desired to fill it with zinc anode mixture during cell preparation.

The above described heat treatment of the anode casing 60 can be accomplished with a treating gas which is an inert gas such as argon. However, the preferred treatment gas is a reducing gas, for example, a gas comprising about 5 wt. % hydrogen and 95 wt. % nitrogen. It is convenient to maintain the gas at the same composition during the entire treating period.

The benefit of the invention can be demonstrated by the following examples.

EXAMPLE 1

No Added Mercury/Anode Casing Heat Treated with Reducing Gas

The anode casing 60 of triclad material having an outer layer of nickel 62, a midlayer of stainless steel 64, and an inner layer of copper 66 is prepared from sheet material. The anode casing wall total thickness is about 0.0119 inches (0.302 mm). The stainless steel layer has a thickness of about 0.009 inches (0.229 mm) and the nickel layer has a thickness of about 0.000928 inches (0.0236 mm). The copper layer has a thickness of about 0.00194 inches (0.049 mm). The triclad sheet material is stamped into shape forming an empty anode casing 60 of configuration as shown in FIG. 1. The anode casing so formed was subjected to the above described heat treatment process with a reducing gas composed of 5 percent by weight hydrogen and 95 percent by weight nitrogen.

Specifically, the empty anode casing 60 was placed in an open ceramic boat which in turn was placed into a quartz furnace. The anode casing was subjected to an initial (ramp) heating period with the reducing gas flowing single pass through the furnace at a rate of about 8 to 10 cc/min. The temperature of the furnace and consequently the temperature of the reducing gas passing over and in contact with the anode casing was increased gradually at a rate of about 15° C. per minute from ambient temperature (20° C.) until a desired soak temperature of about 215° C. was reached. The furnace was then maintained at about soak temperature. The anode casing 60 was heated in a primary (soak) period for a period of about 5 minutes with the reducing gas passing over the anode casing at a constant soak temperature of about 215° C. during the period. The reducing gas flow rate through the furnace during the soak period was at a rate of about 8 to 10 cc/min. The furnace was then shut off and the anode casing 60 allowed to cool gradually to ambient temperature. The cooling period took about 5 to 12 hours depending on the peak soaking temperature. The casing was then removed from the furnace and preferably stored away from air, for example, in a vacuum bag.

A miniature zinc/air cell was then prepared having the components as above described (FIG. 1). The cell had an overall diameter of about 0.608 inches (15.4 mm) and a height (positive to negative terminal) of about 0.314 inches (7.98 mm). The anode casing 60 used was heat treated at 215° C. as above described. The cathode casing 40 was nickel plated steel having a wall thickness of about 0.01 inches (0.25 mm). The cathode catalyst composite 37 had the following composition: $MnO_2$ 4.6 wt. %, carbon black 15.3 wt %, Teflon binder 18.8 wt. %, and nickel mesh screen, 61.2 wt. %. The total cathode catalyst composite 37 was 0.140 g. The anode 50 contained zero added mercury (mercury content was less than 20 ppm of cell weight) and had the following composition: zinc 77.8 wt % (the zinc was alloyed with 200 to 500 ppm each of indium and lead), electrolyte (40 wt % KOH and 2 wt % ZnO) 21.9 wt. %, gelling agent (Waterlock J-550) 0.3 wt %, lead 400 ppm (0.04 wt %). The total anode 50 was 2.43 g and the zinc was 1.9 g.

The cells were divided into two groups. One group was discharged at a constant load of 220 ohms to a cut-off voltage of 0.2 volt and the discharged cells stored in sealed foiled bags at ambient temperature for 7 days. A second group was stored in sealed foil bags at ambient temperature for 30 days without discharging the cells. The amount of gassing which occurred in each group of cells was determined: In the first group (discharged cells) the gassing that occurred during cell discharge and during subsequent storage was determined and is reported in the Table 1. In the second group (undischarged cells) the gassing that occurred during the one month storage at ambient temperature was determined and reported in Table 2. The tabulated data consists of the gas which is retained in the cell (in-cell) and the gas which escapes from the cell while it is stored in foil bags (in-bag). Cells that were discharged were placed in bags after the discharge was complete.

The amount of gassing which occurred while the cells were stored in the sealed foil bags was determined by comparing the difference in total bag weight before and after the storage period. The amount of gassing which became entrapped in the cell (residual gas) was determined by a cell puncture test. The test involves puncturing the cell with a needle. The gas released from the cell enters a cavity and is measured by a pressure transducer.

Another identical triclad anode casing was heated treated in the same manner except that the soak temperature was about 500° C. The furnace was then maintained at about soak temperature. The anode casing 60 was heated in a primary (soak) period for a period of about 15 minutes with the reducing gas passing over the anode casing at a constant soak temperature of about 500° C. during the period. The furnace was then shut off and the anode casing allowed to cool to ambient temperature. The cooling period took about 8 hours. The casing was removed from the furnace and stored in a vacuum bag. Cells were then assembled with identical anode and cathode catalyst compositions as above described in this example. The anode casing which was heat treated at 500° C. was used in the cell assembly. The cells were divided into two groups. One group was discharged at a constant load of 220 ohms to a cut-off voltage of 0.2 volt and the discharged cells stored in sealed foiled bags at ambient temperature for 7 days. A second group was stored in sealed foil bags at ambient temperature for 30 days without discharging the cells. The amount of gassing which occurred in each group of cells was determined: In the first group (discharged cells) the gassing that occurred during cell discharge and during subsequent storage was determined and is reported in the Table 1. In the second group (undischarged cells) the gassing that occurred during the one month storage at ambient temperature was determined and reported in Table 2.

EXAMPLE 2

Comparative

No Added Mercury/Anode Casing Not Heat Treated After Stamping

Identical cells were prepared as described in Example 1 having the same size and components, same anode triclad casing and cathode catalyst composition and same (zero added mercury) anode composition except that anode casing was not heat treated after it was stamped into shape.

As in Example 1 the cells were divided into two groups. One group was discharged at a constant load of 220 ohms to a cut-off voltage of 0.2 volt and the discharged cells stored in sealed foiled bags at ambient temperature for 7 days. A second group was stored in sealed foil bags at ambient temperature for 30 days without discharging the cells. The amount of gassing which occurred in each group of cells was determined: In the first group (discharged cells) the gassing that occurred during cell discharge (in cell) and during subsequent storage (post discharge) was determined and is reported in the Table 1. In the second group (undischarged cells) the gassing that occurred during the one month storage at ambient temperature was determined and reported in Table 2.

EXAMPLE 3

Comparative

Mercury Added to Anode/Anode Casing Not Heat Treated After Stamping

Identical cells were prepared as described in Example 1 having the same size and components, same anode triclad casing and cathode catalyst composition except that mercury was added to the anode and the anode casing was not heat treated after it was stamped into shape. Anode 50 had the same quantity of zinc (1.9 g) as in Example 1. The anode 50 had the following composition: zinc 76.0 wt %, electrolyte (40 wt % KOH and 2 wt % ZnO) 21.3 wt. %, gelling agent (Waterlock J-550) 0.3 wt %, lead 400 ppm (0.04 wt %), mercury 2.4 wt. %. The total anode 50 was 2.48 g. The cathode catalyst composite 37 had the following composition: $MnO_2$ 4.6 wt. %, carbon black 15.3 wt %, Teflon binder 18.8 wt. %, and nickel mesh screen, 61.2 wt. % as in Example 1. The total cathode catalyst composite was 0.140 g.

As in Example 1 the cells were divided into two different groups. One group was discharged at a constant load of 220 ohms to a cut-off voltage of 0.2 volt and the discharged cells stored in sealed foiled bags at ambient temperature for 7 days. A second group was stored in sealed foil bags at ambient temperature for 30 days without discharging the cells. The amount of gassing which occurred in each group of cells was determined: In the first group (discharged cells) the gassing that occurred during cell discharge (in cell) and during subsequent storage (post discharge) was determined and is reported in the Table 1. In the second group (undischarged cells) the gassing that occurred during the one month storage at ambient temperature was determined and reported in Table 2.

TABLE 1

GASSING IN DISCHARGED Zn/Air CELLS

| Cell | Amp-HR to 0.2 V at 220 Ohm Load | Gassing In-Bag, ml | Gassing In-Cell, ml | Total Gassing, ml |
|---|---|---|---|---|
| Example 1 | | | | |
| Heat Treat[1] at 215° C. | 1.21 | 0.2 | 0.4 | 0.6 |
| Heat Treat[1] at 500° C. | 1.21 | 0.0 | 0.3 | 0.3 |
| Comparative[2] Example 2 | 1.19 | 4.6 | 0.7 | 5.3 |
| Comparative[3] Example 3 | 1.32 | 0.0 | 0.5 | 0.5 |

Notes:
[1]Post heat treat anode triclad casing with reducing gas (5 wt. % hydrogen and 95 wt. % nitrogen) after casing was formed. No mercury added to anode.
[2]No mercury added to anode. Anode casing not post heat treated after it was formed.
[3]Mercury added to anode. Anode casing was not post heat treated after it was formed.

TABLE 2

GASSING IN UNDISCHARGED Zn/Air CELLS

| Cell | Gassing In-Bag, ml | Gassing In-Cell, ml | Total Gassing, ml |
|---|---|---|---|
| Example 1 Heat Treat[1] at 500° C. | 0.1 | 0.1 | 0.2 |
| Comparative[2] Example 2 | 1.9 | 0.2 | 2.1 |

Notes:
[1]Post heat treat anode triclad casing with reducing gas (5 wt. % hydrogen and 95 wt. % nitrogen) after casing was formed. No mercury added to anode.
[2]No mercury added to anode. Anode casing not post heat treated after it was formed.

An inspection of the results reported in Table 1 shows a significant reduction in cell gassing occurring with the discharged cell of the invention (Example 1) with zero added mercury but with post heat treatment of the anode casing compared to the gassing reported with discharged comparative cell (Example 2) with zero added mercury and no post heat treatment of the anode casing. Additionally, the results reports in Table 1 show about the same level of gassing and only slighlty less cell discharge capacity with the post heat treated anode casing/zero added mercury cell of the invention (Example 1) compared to that obtained with the comparative cell (Example 3) which employed about 3 wt. % mercury and no post heat treatment of the anode casing. Thus, it has been determined that instead of adding mercury to the anode material the same effect in gassing reduction and overall performance can be realized by post heat treating the anode casing. Also, there was no leaking of electrolyte in the cells with anode casing post heat treated in accordance with the invention, even though mercury was not added to the anode.

Inspection of the results reported in Table 2 shows a significant reduction in cell gassing occurring with the undischarged cell of the invention (Example 1) with no added mercury but with post heat treatment of the anode casing compared to the gassing reported with the comparative cell (Example 2) with zero added mercury and no post heat treatment of the anode casing.

The post heat treatment of the anode casing in the above examples was accomplished using a reducing gas composed of 5 wt. % hydrogen and 95 Wt. % nitrogen. Identical cells as in Example 1 (zero added mercury) were prepared but with the anode casing 60 post heat treated in identical manner but using argon gas instead of the 5 wt. % reducing gas. The cells were discharged in the same manner as in Example 1 (at 220 ohm constant load to a cutoff voltage of 0.2V). The total amount of gassing which occurred (during discharge and after one week storage post discharge) was determined in the same manner as in Example 1. The cells having their anode casing post heat treated with argon gas showed less gassing than the same (zero added mercury) cells with anode casing which were not post heat treated. However, the reduction in gassing is more pronounced when a reducing gas such as mixture of 5 wt. % hydrogen and 95.wt. % nitrogen is used during the heat treatment process. For example, the total gas emission of a discharged (zero added mercury) cell having anode casing post heat treated with reducing gas (5 Wt. % hydrogen and 95 wt. % nitrogen) at 500° C. was 0.3 ml. By comparison the total gas emission of the discharged (zero added mercury) cell having anode casing post heat treated with argon gas at 500° C. was 0.4 ml and the total gas emission of a like discharged (zero added mercury) cell with the anode casing not post heat treated was 5.3 ml.

Although the invention has been described with reference to specific embodiments, it should be appreciated that other embodiments are possible without departing from the concept of the invention. The desired anode casing having reduced concentration of oxides, contaminants and other surface abnormalities could possibly be obtained using alternative methods including mechanical abrasion, chemical treatment or immersion of the casing in a gas plasma. Thus, the invention is not intended to be limited to the specific embodiments but rather its scope is reflected by the claims and equivalents thereof.

What is claimed is:

1. A process for heat treating an anode cup having a layer of copper forming its inside surface, the process comprising:
   (a) heating said anode cup by passing a gas at a temperature between about 200° C. and 700° C. in contact with said anode cup to form a heat treated anode cup; and
   (b) cooling said heat treated anode cup.

2. A process for heat treating an anode cup having a layer of copper forming its inside surface, the process comprising:
   (a) heating said anode cup by passing a gas at a temperature between about 200° C. and 700° C. in contact with said anode cup to form a heat treated anode cup; and
   (b) cooling said heat treated anode cup to ambient temperature.

3. The process of claim 1 wherein the anode cup is of triclad material comprising stainless steel having a layer of nickel on its outside surface and a layer of copper on its inside surface.

4. A process for heat treating an anode cup having a layer of copper forming its inside surface, the process comprising:
   (a) heating said anode cup by passing a gas at a temperature between about 200° C. and 700° C. in contact with said anode cup to form a heat treated anode cup, wherein said gas is a reducing gas; and
   (b) cooling said heat treated anode cup.

5. A process for heat treating an anode cup having a layer of copper forming its inside surface, the process comprising:
   (a) heating said anode cup by passing a gas at a temperature between about 200° C. and 700° C. in contact with said anode cup to form a heat treated anode cup, wherein said gas is a reducing gas comprising hydrogen; and
   (b) cooling said heat treated anode cup.

6. A process for heat treating an anode cup of a zinc/air depolarized cell after the cup has been formed but before anode material comprising zinc is inserted therein, said anode cup having a layer of copper forming its inside surface, the process comprising:
   (a) heat treating said anode cup by passing a gas at a temperature between about 200° C. and 700° C. in contact therewith to form a heat treated anode cup; and
   (b) cooling said heat treated anode cup to ambient temperature.

7. The process of claim 6 further comprising the step (c) of storing said heat treated anode cup away from atmospheric air.

8. The process of claim 6 wherein the anode cup is of triclad material comprising stainless steel having a layer of nickel on its outside surface and a layer of copper on its inside surface.

9. The process of claim 8 wherein the anode cup has a wall thickness between about 0.001 inches (0.0254 mm) and 0.015 inches (0.38 mm).

10. The process of claim 8 wherein the copper layer has a thickness of between about 0.0002 inches (0.005 mm) and 0.002 inches (0.05 mm).

11. The process of claim 6 wherein said heat treating removes oxides on the surface of said copper layer.

12. The process of claim 11 wherein said oxides comprise copper oxide.

13. The process of claim 6 wherein the heat treating gas is a reducing gas.

14. The cell of claim 13 wherein said gas is a reducing gas comprising hydrogen.

15. The process of claim 6 wherein said heating treating is accomplished with a gas at a temperature range between about 300° C. and 600° C. in contact with said anode cup.

16. The process of claim 6 wherein said heat treating is accomplished with said gas within a temperature range between about 400° C. and 600° C.

17. The process of claim 6 wherein the heat treating in step (a) is carried out by passing said gas over said anode cup within a furnace.

18. The process of claim 6 wherein said heat treating in step (a) is carried out by (a.1) initially heating the anode cup by increasing the gas temperature while the gas contacts the anode cup until a soak temperature between about 300° C. and 600° C. is reached and then (a.2) maintaining said anode cup in contact with said gas at said soak temperature between about 300° C. and 600° C. for a period between about 5 and 25 minutes.

19. The process of claim 18 wherein the anode cup is initially subjected to heat treating in step (a.1) with said gas in contact therewith wherein the initial temperature of said gas is a temperature at about room temperature between about 20° C. and 30° C.

* * * * *